3,450,761
1-AMINOETHYLDIMETHYLADAMANTANE
Abraham Schneider, Overbrook Hills, Pa., assignor to Sun Oil Company, Philadelphia, Pa., a corporation of New Jersey
No Drawing. Filed Mar. 30, 1967, Ser. No. 626,946
Int. Cl. C07c 87/42, 87/40
U.S. Cl. 260—563　　　　　　　　　　　　1 Claim

ABSTRACT OF THE DISCLOSURE

An adamantane derivative, 1-amino-3-ethyl-5,7-dimethyladamantane, is disclosed. It exhibits activity against herpes simplex virus in virology tests with mice.

BACKGROUND OF THE INVENTION

This invention relates to 1-amino-3-ethyl-5,7-dimethyladamantane as a new compound.

The cage-like structure of the adamantane nucleus has been illustrated in several ways, of which the following is one example:

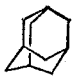

As can be seen, it consists of three condensed cyclohexane rings arranged so that there are four bridgehead carbon atoms which are equivalent to each other.

Certain amino derivatives of adamantane have been prepared heretofore and reported in the literature. The following references disclose the preparation of certain bridgehead monoamino (1-amino) derivatives: Stetter et al., Chem. Ber., 93, 226–230 (1960); Gerzon et al., J. Med. Chem., 6, 760–763 (1963); and Prelog et al., Ber., 74B, 1769–1772 (1941). Specifically the following 1-amino compounds have been disclosed: 1-aminoadamantane (also designated adamantyl-1-amine and 1-adamantanamine); 1-amino-3-methyladamantane (also designated 3-methyladamantyl-1-amine); and 1-amino-3,5-dimethyladamantane (also designated 3,5-dimethyladamantyl-1-amine).

Considerable study has been made of 1-aminoadamantane (1-adamantanamine) with respect to potential antiviral activity and reference to such work can be found, for example, in an article by Wood, Annals New York Academy of Sciences, 130, Art. 1, 419–431, July 30, 1965. This work has indicated that 1-aminoadamantane, administered in its hydrochloride salt form, has antiviral effect against some viruses, mainly showing inhibitory activity with respect to Type A strains of influenza. This compound does not, however, exhibit a wide spectrum of activity, and is inactive against herpes simplex virus, for example, and numerous other viruses as can be seen from the cited article.

SUMMARY OF THE INVENTION

The 1-amino-3-ethyl-5,7-dimethyladamantane is a non-viscous liquid having an odor typical of amines. Its hydrochloride salt is a water-soluble white crystalline solid with a melting point above 250° C. and having the structure:

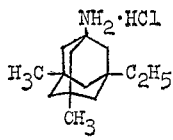

This compound, in contrast to its adamantyl and dimethyladamantyl homologues, shows unexpected antiviral activity against herpes simplex virus in animal tests.

DESCRIPTION

The compound of the invention can be prepared from 1-ethyl-3,5-dimethyladamantane in several ways. One way is by first converting the starting hydrocarbon to 1-nitro-3-ethyl-5,7-dimethyladamantane and then reducing the nitro substituent to an amino group. Such nitration is described in my United States Patent No. 3,258,498 and reduction of the nitro product to the amino derivative is therein disclosed. Known procedures for effecting conversion of nitro to amino groups can be utilized, such as that described in United States Patent No. 3,053,907 for the hydrogenation of 1,3-dinitroadamantane to produce the corresponding diamino product. This procedure involves treating the nitro compound at 50–60° C. with hydrogen at 50 p.s.i.g. employing Raney nickel as catalyst.

Another way of preparing the present compound is first to convert the starting hydrocarbon to its bridgehead hydroxy derivative, convert the latter by the Ritter reaction to a corresponding amide such as 1-acetamido-3-ethyl-5,7-dimethyladamantane, and then hydrolyze the amido substituent to the amino group. In the first step the hydroxy derivative can be obtained by contacting the starting hydrocarbon in the absence of a solvent with air at atmospheric pressure at a temperature in the range of 120–200° C. and in the presence of a soluble oxidation catalyst such as a carboxylic acid salt of cobalt, as described in my copending application United States Ser. No. 395,557, filed Sept. 10, 1964 now U.S. Patent No. 3,356,740. Alternatively the bridgehead hydroxy derivative can be prepared by oxidizing the starting hydrocarbon by means of chromic acid in aqueous acetic acid of 70–90% concentration, employing 2–4 moles of chromic acid per mole of hydrocarbon and a temperature of 70–100° C. The second step (Ritter reaction) can be carried out in known manner by reacting the hydroxy derivative with, for example, acetonitrile in glacial acetic acid using concentrated sulfuric acid as catalyst to form the acetamido derivative. Finally this compound can be deacetylated by treatment with KOH in diethylene glycol under reflux conditions and the resulting 1-amino-3-ethyl-5,7-dimethyladamantane recovered in the form of a hydrochloride salt, all in the manner disclosed in the above-cited article by Gerzon et al.

As a variation of the second procedure described above, the same general route can be followed except that the bridgehead chloro or bromo ethyldimethyladamantane is prepared and used instead of the hydroxy derivative. Preparation of the bridgehead halo derivative can be carried out in the manner disclosed by Koch et al., Ber., 96, 213–219 (1963), for the bromination of 1,3,5-trimethyladamantane at the unsubstituted bridgehead position.

As indicated above, it has been found that 1-amino-3-ethyl-5,7-dimethyladamantane has an unexpected antiviral activity against herpes simplex virus. In tests on mice in which the compound was administered either orally or subcutaneously, significant protection against the herpes simplex virus was noted with particularly good results being obtained when the drug was orally administered. In contrast, when either 1-aminoadamantane or 1-amino-3,5-dimethyladamantane was used in similar mice tests, no significant protection against herpes simplex infection was obtained.

Examples 1–3 which follow illustrate, respectively, the several steps in one procedure for converting 1-ethyl-3,5-dimethyl-adamantane (hereinafter "EDMA") to 1-amino-3-ethyl-5,7-dimethyladamantane. Identification of products from the various steps was done by means of gas chromatography and IR, NMR and mass spectra.

EXAMPLE 1

Preparation of EDMA alcohol

To a stirred solution of 16.2 g. (0.162 mole) chromium trioxide in 30 ml. water and 170 ml. glacial acetic acid were added 21 g. (0.109 mole) of EDMA in 1 ml. increments over a ten minute period. The temperature was kept at 25–30° C. during the addition and the mixture was then heated to 75° C. for 3 hours. The solution was extracted with ether. The ether extract was washed successively with aqueous sodium carbonate and water, and then was dried over magnesium sulfate. The ether was evaporated to leave a gummy tan solid which was recrystallized twice from acetone to yield 5.1 g. (22%) of white needles, M.P. 82.5–83.5° C. This product was identified as the monoalcohol, 1-hydroxy-3-ethyl-5,7-dimethyladamantane.

EXAMPLE 2

Preparation of EDMA acetamide

Fourteen ml. of concentrated sulfuric acid were added to a stirred solution containing 32 g. (0.154 mole) of 1-hydroxy-3,5-dimethyl-7-ethyladamantane and 46 ml. acetonitrile in 350 ml. glacial acetic acid. The addition required 20 minutes, following which the solution was stirred at room temperature for 4 hours. The contents were then poured into 300 ml. of ice to form a white precipitate which was filtered off and dried. The crude solid was recrystallized twice from ligroin to yield 16.4 g. (43%) of white needles, M.P. 147–148° C., identified as 1-acetamido-3-ethyl-5,7-dimethyladamantane.

EXAMPLE 3

Preparation of EDMA amine

To a hot solution of 3 g. (0.054 mole) of finely powdered potassium hydroxide in 75 ml. diethylene glycol were added 2 g. (0.008 mole) of 1-acetamido-3-ethyl-5,7-dimethyladamantane, and the solution was heated until the acetamido compound had dissolved. Then 1 ml. of water was added and the solution was refluxed for 5 hours. After standing overnight the contents were poured onto 100 ml. of ice, and the aqueous layer was extracted with four 50 ml. portions of ether. The ether extracts were combined, washed with water and dried. The ether was partially evaporated to leave about 100 ml. of residue and anhydrous hydrogen chloride was bubbled into the same, causing a white solid to precipitate. The solid was separated, then dissolved in an ethanol-ether mixture and the solution was decolorized by means of charcoal, following which the product was recrystallized from the solution to yield 1.0 g. (51%) of white crystals, M.P. >250° C. The infrared spectrum showed a peak at 3100 cm.$^{-1}$ indicative of primary amine hydrochloride, and another peak at 1360 cm.$^{-1}$ indicative of the adamantane nucleus. Specifically the product was identified as 1-amino-3-ethyl-5,7-dimethyladamantane.

Comparative virology tests

A series of in vivo virology tests with mice was made to compare the present compound (designated 1-amino-EDMA) with 1-aminoadamantane (1-amino-A) and 1-amino-3,5-dimethyladamantane (1-amino-DMA) with respect to antiviral activity against herpes simplex virus. In these runs each of the drugs was administered in the form of an aqueous solution of its hydrochloride salt. Each set of tests involved a comparison between mice treated with the compound in question and inoculated with the virus and a control group of untreated mice similarly inoculated. The quantity of herpes simplex virus used was that amount which would induce 50% mortality in the control animals within 21 days. The virus inoculum was introduced interperitoneally. In some cases the route of drug administration was oral (PO), in others subcutaneous (SC) and in others intraperitoneal (IP), as indicated in Table I. Results of the tests were rated by means of an alphabetical scale having the following approximate meaning:

A—Good activity, with an increased mean survival time of the treated mice.
B—Less but statistically significant activity.
C—No significant activity.

The results are shown in Table I.

TABLE I

| Treating agent [1] | Route of drug administration | Total dosage, mg./kg. | Rating |
|---|---|---|---|
| 1-amino-EDMA | PO | 0.04 | A |
| Do | PO | 0.4 | A |
| Do | PO | 2.5 | A |
| Do | PO | 0.04 | A |
| Do | PO | 0.4 | A |
| Do | PO | 2.5 | C |
| Do | SC | 0.03 | B |
| Do | SC | 0.3 | C |
| Do | SC | 3.0 | C |
| 1-amino-A | SC | 0.6 | C |
| Do | SC | 1.2 | C |
| Do | IP | 0.6 | C |
| Do | IP | 1.2 | C |
| 1-amino-DMA | SC | 0.6 | C |
| Do | SC | 1.2 | C |
| Do | IP | 0.1 | C |
| Do | IP | 0.2 | C |
| Do | IP | 0.4 | C |
| Do | IP | 0.6 | C |
| Do | IP | 1.2 | C |

[1] Administered as HCl salt in each case.

The results in Table I show that the compound of the present invention can inhibit infection in mice by herpes simplex virus. In contrast, the 1-amino compounds derived from adamantane and dimethyladamantane exhibited no antiviral activity whatever against herpes simplex in these tests.

I claim:
1. 1-amino-3-ethyl-5,7-dimethyladamantane.

References Cited

Gerzon et al., C. A., vol. 60, 1964, pp. 4022–4023.

CHARLES B. PARKER, *Primary Examiner.*

P. C. IVES, *Assistant Examiner.*

U.S. Cl. X.R.

260—516, 617; 424—325